June 6, 1939.  N. M. RUST  2,161,593
BAND-PASS FILTER
Filed March 26, 1936  2 Sheets-Sheet 2
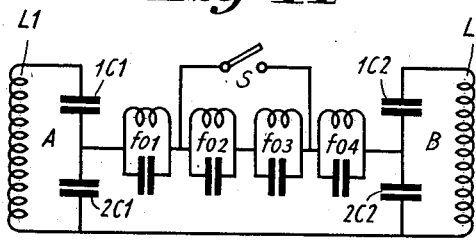
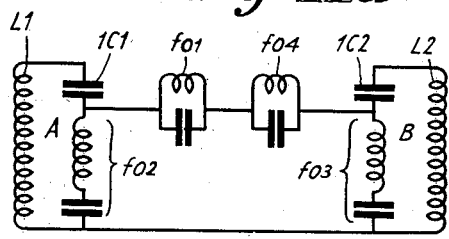
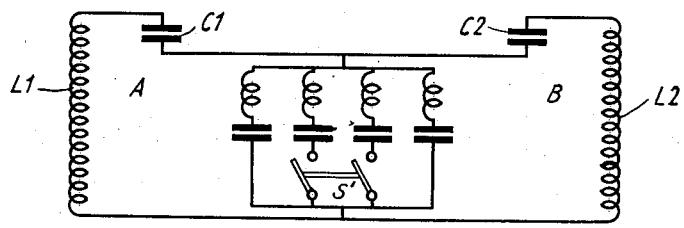
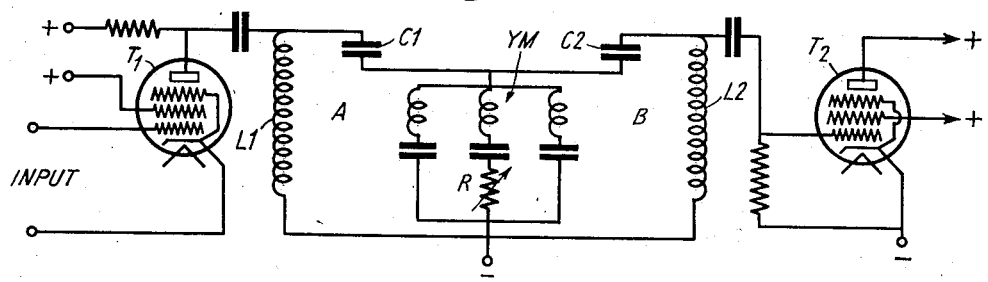
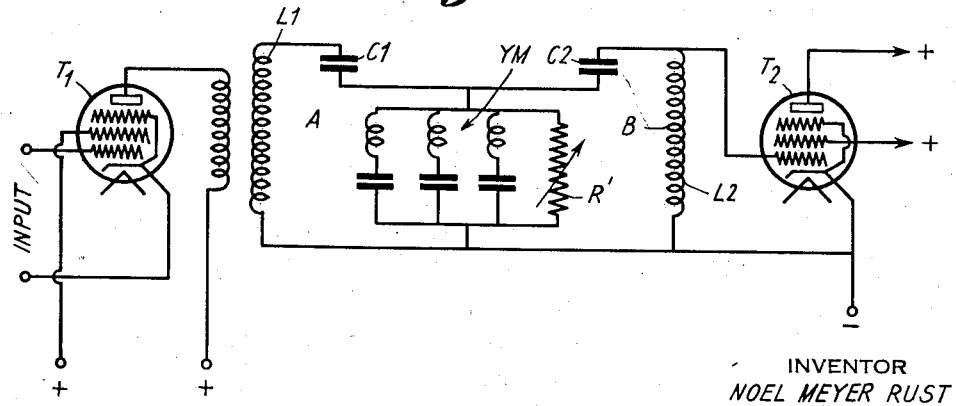
INVENTOR
NOEL MEYER RUST
BY
ATTORNEY Patented June 6, 1939

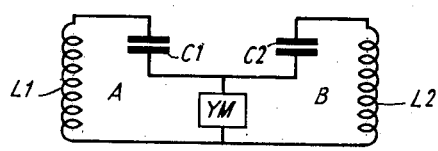
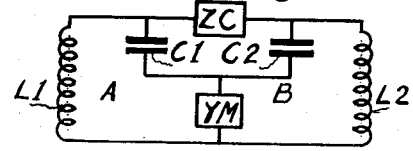
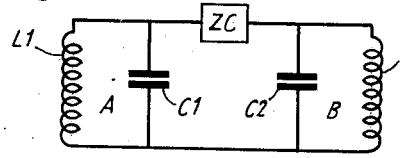
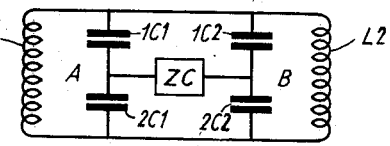
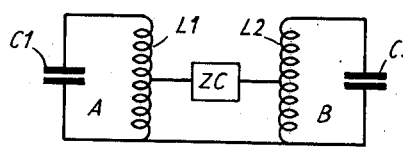
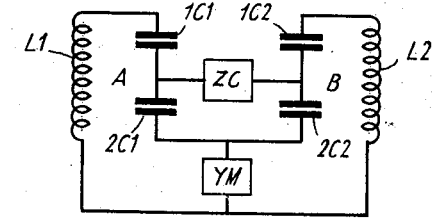
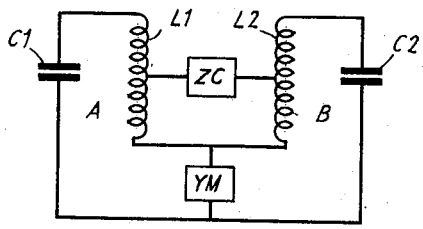
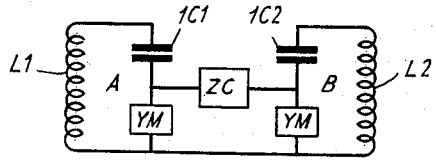
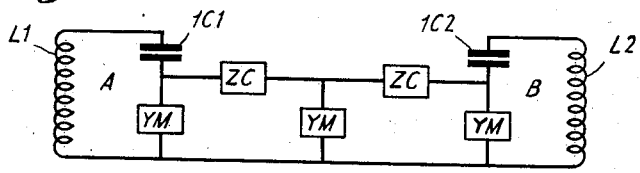
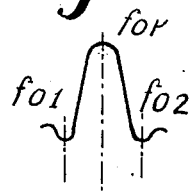
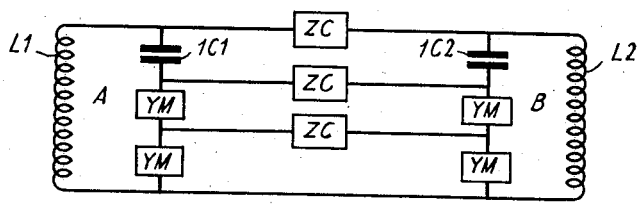

2,161,593

UNITED STATES PATENT OFFICE 2,161,593

BAND-PASS FILTER

Noël Meyer Rust, Chelmsford, England, assignor to Radio Corporation of America, a corporation of Delaware Application March 26, 1936, Serial No. 70,928
In Great Britain March 29, 1935

4 Claims. (Cl. 178—44)

This invention relates to electrical filters and has for its object to provide band pass filters of the multi-resonant type suitable for use as interstage thermionic tube coupling means in radio receivers and similar high frequency apparatus. Filters in accordance with this invention are, therefore, essentially not impedance-matched or bridge filters since they are required to couple an impedance such as that of the anode-cathode space of a thermionic tube to a practically infinite impedance such as that of the grid-cathode space of a following tube.

The invention relates more specifically to band pass filters of the kind wherein resonant circuits are connected or coupled by impedance networks, and according to the said invention such a coupling or connecting impedance network in a band pass filter of the kind referred to is constituted by a multi-resonant network including at least two resonant circuits each resonant at a different frequency, the resonant frequencies being so chosen that the square root of their products is equal to the mean frequency of the band desired to be passed. There may be more than two resonant circuits in the multi-resonant network and where there is an odd number of resonant circuits, one of said circuits may be made resonant at the mean frequency of the band to be passed, and there may be an equal number of other resonant circuits tuned to frequencies below and above the said means frequency. Where there is an even number of resonant circuits in a multi-resonant network, there may be provided an equal number of resonant circuits tuned to frequencies below and above the mean frequency of the band to be passed.

The invention is illustrated in and further explained in connection with the accompanying drawings which show diagrammatically several embodiments of the invention, like reference characters designating similar elements throughout the several figures. Briefly, Fig. 1 is a diagrammatic showing of a form of band pass filter, according to the invention wherein the coupling network is common to the resonant circuits of the filter; Fig. 1a illustrates the frequency response characteristic obtained; Fig. 3 shows diagrammatically another form of filter wherein the coupling network is series connected with the resonant circuits of the filter; Fig. 2 is a diagrammatic showing of a filter circuit embodying the coupling networks used in Figs. 1 and 3; Figs. 4 and 5 are modifications of the circuit shown in Fig. 3; Figs. 6 and 7 are modifications of Fig. 2; Figs. 8 to 10 are modifications of Fig. 4; Fig. 11 is similar to the circuit of Fig. 4 but disclosing the component elements comprising the coupling network; Fig. 11a is a modification of Fig. 11; Fig. 12 is similar to the circuit of Fig. 1 but disclosing the component elements comprising the coupling network, and Figs. 13 and 14 illustrate modifications of Fig. 12.

Referring to Figure 1, which shows one form of band pass filter in accordance with this invention, there is a loop circuit consisting of an inductance L1, two condensers C1—C2 and a second inductance L2 in series in the order stated, the junction point of the two condensers being joined to the junction point of the two inductances by a multi-resonant network YM, one inductance L1 and the condenser C1 adjacent thereto constituting one tuned circuit (which may be referred to as circuit A), and the other inductance L2 and condenser C2 adjacent thereto constituting another circuit (circuit B), the two circuits A and B being resonant either to the same frequency or to two frequencies adjacent one another. The multi-resonant network YM may be constituted by two acceptor circuits connected in parallel, each consisting of an inductance in series with a condenser, and if one of these acceptor circuits is series-resonant at a frequency $fo1$ and the other at a frequency $fo2$, the circuits A and B being resonant at or closely on either side of a frequency $for$, and if the square root of the product of $fo1$ and $fo2$ is equal to $for$, then a band pass filter effect will be obtained, the band pass curve being of the type shown in Figure 1a, having fairly steep sides and a fairly flat top, there being dips at the frequencies $fo1$ and $fo2$ (these are the cut-off frequencies) and the frequency $for$ occurring at the middle of the relatively flat top of the curve.

A second form of filter in accordance with this invention and illustrated in Figure 3 consists of two parallel tuned circuits A and B which are directly connected together at one end and connected together at the other through a multi-resonant network ZC, the said network comprising a plurality of parallel-tuned circuits connected in series and being resonant at least at two frequencies substantially corresponding respectively to the upper and lower limits of the band to be passed.

In a third modification of the invention illustrated in Figure 4 there are again two parallel-tuned circuits A and B which are, as in Figure 3, directly connected together at one end but the capacitative portion of each of the tuned circuits thereof is constituted respectively by two series connected condensers 1C1—2C1 and 1C2—2C2 and the junction point of the two condensers of one tuned circuit (A) is connected to that of the two condensers of the other (B) through a multi-resonant network ZC.

In a fourth embodiment shown in Figure 5 the multi-resonant network ZC connects together two similar tap points upon the inductances of the two tuned circuits A and B which as before are directly connected together at one end. In this case, of course, each tuned circuit may have its capacitative arm constituted merely by a single condenser as illustrated.

In a still further embodiment shown in Fig. 2 the circuit of Figure 1 is modified by providing an additional multi-resonant network ZC interconnecting those terminals (high potential) of the tuned circuits A and B where the condenser of each tuned circuit joins the inductance thereof. Of course, this additional multi-resonant network ZC will be constituted by parallel-tuned circuits connected in series in contradistinction to the other multi-resonant network YM which is constituted by series-tuned circuits connected in parallel. This embodiment may be fairly regarded as a combination of the first and second embodiments herein described.

Similarly the embodiment of Figure 4 may be modified as shown in Figure 6 by not directly connecting together the two circuits A and B at one end, but instead directly connecting together the inductances of these two circuits at one end, the adjacent ends of the capacitative branches of these two circuits being directly connected together by a separate lead and the two connection leads (one of which joins the capacitative branches and the other of which joins the inductive branches) being connected together through an additional multi-resonant network YM of the acceptor type (a plurality of acceptor circuits in parallel), the other multi-resonant network ZC being, of course, of the high impedance type (a plurality of parallel tuned circuits in series).

A similar modification may as shown in Figure 7 be made to the embodiment of Figure 5, i. e. an additional multi-resonant network YM may be added between a lead connecting together the inductive branches of the circuits A and B at one end and a lead connecting together the capacitative branches of these circuits at the same end.

In another embodiment illustrated in Figure 8 and which may be regarded as a modification of the embodiment disclosed in Figure 4, the condenser 2C1 in the circuit A (Figure 4) is replaced (in Figure 8) by a multi-resonant network YM of the acceptor type and the corresponding condenser 2C2 of circuit B (Figure 4) is also replaced (in Figure 8) by a multi-resonant circuit YM of the acceptor type.

In still a further embodiment, illustrated in Figure 9, the embodiment of Figure 8 is modified by replacing the multi-resonant network ZC interconnecting circuits A and B (this network is, of course, of the high impedance type) by two high impedance multi-resonant networks (each marked ZC) connected in series and connecting the junction point of these two networks to the junction point of the two acceptor type networks YM (of Figure 8) through a third acceptor type network also marked YM.

In a still further modification illustrated in Figure 10 of the embodiment of Figure 8 two additional high impedance multi-resonant networks ZC and two additional acceptor type multi-resonant networks YM are provided interconnected as shown.

As above stated the multi-resonant networks employed in carrying out this invention may be resonant at more than two frequencies. For example, in the embodiment of Figure 1 the coupling multi-resonant network YM may be constituted by four series-resonant circuits connected in parallel with one another (Figure 12), the four circuits being resonant as acceptor circuits for the frequencies $fo1$, $fo2$, $fo3$ and $fo4$ respectively, the first two of these frequencies being below and the other two being above the mean frequency $for$ of the band desired to be passed. The frequencies $fo1$, $fo2$, $fo3$ and $fo4$ are so chosen that the fourth root of their products is equal to the mean frequency $for$. A filter as just described would produce a band pass curve having very steep sides and by suitable choice of the circuit elements a narrow and fairly flat top of the curve can be obtained. Furthermore the result can be achieved that the rises of the curve outwardly of the dip frequencies are relatively small.

Again the multi-resonant network ZC, in the embodiment of Figure 4 for example, may be constituted by four parallel-resonant circuits connected in series with one another (Figure 11), these circuits being of different resonant frequencies, $fo1$, $fo2$, $fo3$ and $fo4$ respectively, so chosen that the fourth root of their product is equal to the mid-frequency $for$, of the band desired to be passed. In one practical example of a filter as just described the circuits A and B are made each resonant to the mid-frequency $for$, and the frequencies $for$, $fo1$, $fo2$, $fo3$, $fo4$ are chosen to be 100,000, 87,000, 91,600, 109,000 and 115,000 cycles per second respectively. By suitable choice of the circuit elements, it was found possible to obtain a relatively flat topped band pass curve 10 kilocycles wide having steep sides of relatively great height, there being a minimum attenuation (measured to the corners of the flat top portion) of about 40 decibels. In the particular case just described the two series condensers in each tuned circuit A or B are of unequal value, that (2C1 or 2C2) connected at one side to the direct connection between circuits A and B being 10 times the magnitude of the other (1C1 or 1C2).

In a modification, illustrated in Figure 11a, of the filter just described and producing very similar results to those achieved by the said filter last described, the larger condenser in each of the circuits A and B is replaced by a series-resonant circuit, and, instead of having four parallel-resonant circuits in series with one another between the circuits A and B, only two are provided, these two parallel-resonant circuits being resonant at frequencies $fo1$ and $fo4$, the two series resonant circuits—one in circuit A and the other in circuit B—being resonant to $fo2$ and $fo3$ respectively.

As will be appreciated it is not necessary for the two tuned circuits A and B to be resonant to the same frequency and by slightly staggering their resonant frequencies equally on opposite sides of the mean frequency ($for$) to be passed, a considerable degree of control may be obtained upon the shape and in particular upon the width of the relatively flat top of the band pass curve.

Filters in accordance with this invention are, since they are essentially unmatched filters, capable of a wide variety of uses, the main use probably being to couple the anode of one thermionic tube to the grid of a succeeding tube in cascade therewith. Considerable control of the shape of the band pass curve of filters in accordance with this invention may be obtained by providing shunt and/or series resistances in the arms of the filters to control the damping. For example, if in the embodiment of Figure 1, the multi-resonant network YM consists of three acceptor circuits connected in parallel, one being resonant at the mid-frequency $fo r$ and the other two being resonant at frequencies, $fo1$, $fo2$ equally spaced on either side of this mid-frequency, it is very convenient to provide a variable series resistance R in series with that acceptor circuit resonant at the frequency $for$, as shown for example in Figure 13. Another convenient arrangement is to connect an adjustable resistance R' in shunt across all three of these acceptor circuits, as shown for example in Figure 14.

The invention can be readily applied to provide band pass filters of variable width of band pass. For example, if in the embodiment of Figure 4, the multi-resonant network ZC be constituted by four differently resonant parallel-tuned circuits connected in series, two different widths of band pass can be obtained by providing (as shown in Figure 11) a switch S which when closed short circuits the middle two of the series-connected parallel-resonant circuits. If the four series-connected parallel-resonant circuits be resonant at frequencies $fo1$, $fo2$, $fo3$ and $fo4$ ($fo1$ and $fo2$ being spaced to one side of $for$ and $fo3$ and $fo4$ being symmetrically spaced to the other) and if the switch be arranged to short circuit the two circuits resonant to $fo2$ and $fo3$, then when the said switch is open there will be high selectivity—that is to say the band passed will be a narrow band—while when the said switch is closed there will be high fidelity and lower selectivity—that is to say, the band passed will be a wide band. Similarly, if in the embodiment of Figure 1 the multi-resonant network YM is constituted by four acceptor circuits connected in parallel, the double switch S' may be provided as shown in Figure 12 connected in series with two of these acceptor circuits, and when the switch is closed high selectivity will be obtained, the selectivity being reduced when the switch is opened.

The invention is of wide application but probably its most important applications are to intermediate frequency filters for broadcast receivers and to receivers e. g. of the super-heterodyne type and to receivers e. g. of television receivers, for receiving carrier wave energy modulated with a very wide band of modulating frequencies.

Figures 13 and 14 show two examples wherein a filter as shown in Figure 1 is employed as the coupling network between a pair of tubes, $T_1$ and $T_2$. It is thought that these figures will be self-explanatory and it will be noted that the filter is not an impedance-matched or bridge filter, but is, as are all filters in accordance with this invention, employed to couple an impedance such as the anode cathode circuit of a tube to a very high or practically infinite impedance such as the grid-cathode space of a following tube.

Having now particularly described and ascertained the nature of my said invention and in what manner the same is to be performed, I declare that what I claim is:—

1. A band pass filter comprising a pair of main parallel-tuned circuits resonant to the mean frequency of the band to be passed and conductively connected at their low potential ends, and an impedance network connecting similar high potential points of said parallel-tuned circuits, such impedance network comprising an even number of series-connected resonant circuits, half of which are tuned above and the other half below the mean frequency of the band to be passed, the resonant frequencies of said latter circuits being symmetrical with respect to said mean frequency.

2. A band pass filter as defined in claim 1, wherein short circuiting means are provided for an intermediate pair of said resonant circuits of which one is tuned above and the other below the mean frequency whereby the width of the passed band may be selectively altered.

3. A band pass filter as defined in claim 1, wherein the main tuned circuits each comprises an inductance arm and a shunt arm consisting of a pair of unequal series-connected condensers, said impedance network connecting the main tuned circuits at the common terminals of said series-connected condensers.

4. A band pass filter as defined in claim 1, wherein the main tuned circuits each comprises an inductance arm and a shunt arm, the latter consisting of a condenser and a serially connected series-tuned circuit, said impedance network connecting the main tuned circuits at the common terminals of said condensers and series-tuned circuits.

NOËL MEYER RUST.